US012281010B2

(12) United States Patent
Tanaka et al.

(10) Patent No.: US 12,281,010 B2
(45) Date of Patent: Apr. 22, 2025

(54) ALUMINUM NITRIDE-BASED POWDER AND METHOD FOR PRODUCING SAME

(71) Applicant: Toyo Aluminium Kabushiki Kaisha, Osaka (JP)

(72) Inventors: Takamasa Tanaka, Osaka (JP); Jun Kusui, Osaka (JP); Katsumi Nakashima, Osaka (JP); Kazuya Higashimura, Osaka (JP); Shuhei Kanno, Osaka (JP)

(73) Assignee: Toyo Aluminium Kabushiki Kaisha, Osaka (JP)

( * ) Notice: Subject to any disclaimer, the term of this patent is extended or adjusted under 35 U.S.C. 154(b) by 1552 days.

(21) Appl. No.: 16/615,498

(22) PCT Filed: May 17, 2018

(86) PCT No.: PCT/JP2018/019074
§ 371 (c)(1),
(2) Date: Jan. 21, 2020

(87) PCT Pub. No.: WO2018/216591
PCT Pub. Date: Nov. 29, 2018

(65) Prior Publication Data
US 2020/0140276 A1    May 7, 2020

(30) Foreign Application Priority Data
May 22, 2017    (JP) .................. 2017-101283

(51) Int. Cl.
*C01B 21/072* (2006.01)
*C08K 3/28* (2006.01)

(52) U.S. Cl.
CPC .............. *C01B 21/072* (2013.01); *C08K 3/28* (2013.01); *C01P 2004/03* (2013.01); *C01P 2004/60* (2013.01); *C08K 2003/282* (2013.01)

(58) Field of Classification Search
None
See application file for complete search history.

(56) References Cited

U.S. PATENT DOCUMENTS 5,049,367 A * 9/1991 Nakano ............... H01L 21/4807
501/98.4
5,646,078 A * 7/1997 Mohri ................... C01B 21/072
501/98.4

(Continued)

FOREIGN PATENT DOCUMENTS

JP    01-182331 A    7/1989
JP    H07-215707 A   8/1995
(Continued)

OTHER PUBLICATIONS

Yoshida et al.; JP2003119010A; translation provided by GooglePatents, Mar. 7, 2024.*

(Continued)

*Primary Examiner* — Guinever S Gregorio
(74) *Attorney, Agent, or Firm* — Troutman Pepper Locke LLP; James E. Armstrong, IV; Nicholas J. DiCeglie, Jr.

(57) ABSTRACT

To provide an aluminum nitride-based powder that includes less amount of fine powder that is hard to be completely removed, has superior filling performance for a polymeric material, and also has thermal conductivity. The present invention relates to an aluminum nitride-based powder comprising aluminum nitride-based particles, wherein (1) the average particle size D50 is 15 to 200 μm; (2) a content of particles having a particle size of at most 5 μm is at most 60% on a particle number basis; (3) a content of an alkaline earth metal element and a rare-earth element is at most 0.1 weight %; (4) a content of oxygen is at most 0.5 weight %; and (5) a content of silicon is at most 1000 ppm by weight, and a content of iron is at most 1000 ppm by weight.

11 Claims, 3 Drawing Sheets

(56) References Cited

U.S. PATENT DOCUMENTS

| | | | | |
|---|---|---|---|---|
| 11,325,830 | B2 * | 5/2022 | Kuramoto | ............. C01B 21/072 |
| 2012/0258310 | A1 * | 10/2012 | Watanabe | ............. C01B 21/072 |
| | | | | 423/412 |

FOREIGN PATENT DOCUMENTS

| | | | |
|---|---|---|---|
| JP | 2000-016805 | A | 1/2000 |
| JP | 2003-119010 | A | 4/2003 |
| JP | 2004-182585 | A | 7/2004 |
| JP | 2013-60322 | A | 4/2013 |
| JP | 2013-87042 | A | 5/2013 |
| JP | 2016-37438 | A | 3/2016 |

OTHER PUBLICATIONS

Koki; JP2007284315A; translation provided by Google Patents Sep. 6, 2024.*
International Search Report mailed Jul. 3, 2018, issued for PCT/JP20018/019074.

* cited by examiner

ALUMINUM NITRIDE-BASED POWDER AND METHOD FOR PRODUCING SAME

TECHNICAL FIELD

The present invention relates to an aluminum nitride-based powder and a method of producing the same, and more particularly to highly heat-dissipating and thermal-conductive aluminum nitride-based particles suitable as a filler powder that is used for a heat-dissipating sheet, grease, adhesive, paint, etc. based on a polymeric material such as a resin, and a method of producing the same.

BACKGROUND ART

As electronic products such as a laptop computer and a tablet computer are more downsized and slimmed, or advanced, a more highly integrated IPU, circuit, and the like for use in such a computer are more and more demanded. As such high integration advances, the heating value in operation increases, which necessitates efficient heat dissipation. Generally, a polymeric material such as a resin is used as a heat-dissipating member in such an electronic component. The thermal conductivity of the polymeric material itself is, however, extremely low, which makes it necessary to composite the polymeric material with a highly thermal-conductive filler.

Various materials are proposed as a thermal-conductive filler. Particularly, a sintered aluminum nitride is put to practical use for substrates of semiconductors, and aluminum nitride in the form of powder is used as a heat-dissipating filler since aluminum nitride has a high thermal conductivity like metals.

Generally, aluminum nitride used as a filler is an aluminum nitride powder having an average particle size of approximately 1 to 100 μm. It is believed to be desirable to incorporate the aluminum nitride powder into a resin so that the filling rate is at least 60 volume % (particularly at least 70 volume %) for obtaining desired thermal conductivity. In addition, fillers having different particle size distributions are combined for increasing the filling rate more. In this case, an aluminum nitride powder generally having a large average particle size of at least 10 μm plays an important role as a filler, as well as an aluminum nitride fine powder, since superior in filling performance for a resin.

Because of this, various methods of producing such an aluminum nitride powder having a comparatively large particle size have been proposed so far.

Examples thereof include a method of producing a large-sized aluminum nitride powder, the method including calcining a mixed granulated material obtained by press granulation on a mixed powder of 30 to 80 parts by weight of a metal aluminum powder and 70 to 20 parts by weight of an aluminum nitride powder so that the total parts thereof is 100 parts by weight, in a nitrogen-containing non-oxidizing atmosphere at 800° C. to 1200° C., and thereafter cracking and classifying the calcined material (Patent Document 1).

Examples of such a known method also include a method of producing a spherical aluminum nitride-based particle, the method includes a calcining step I of calcining a porous alumina granule at 1450° C. to 1900° C. to nitride the granule so that the granule contains 50 to 90 mass % of aluminum nitride, and a calcining step II of calcining a particle obtained in the calcining step I in an atmosphere where the concentration of a reducing gas is higher than in the calcining step at 1580° C. to 1900° C. to nitride the particle so that the particle contains of 75 to 99 mass % of the aluminum nitride, the spherical aluminum nitride-based particle having an average particle size of 10 to 200 μm and a sphericity of at least 0.80, the spherical aluminum nitride-based particle including a core containing aluminum oxynitride, and a surface layer formed over the surface of the core which has a thickness of at least 2 μm and which is formed of aluminum nitride, the spherical aluminum nitride-based particle containing 75 to 99 mass % of aluminum nitride and having a relative density of at least 85% (Patent Document 2).

Examples thereof also include a method of producing an aluminum nitride granule, the method including a reducing and nitriding step of reducing and nitriding on a porous alumina granule at not less than 1400° C. and not more than 1700° C. to form a porous aluminum nitride granule, and a sintering step of sintering the porous aluminum nitride granule obtained in the reducing and nitriding step at not less than 1580° C. and not more than 1900° C. (Patent Document 3).

Another example of such a known method includes a method of producing an aluminum nitride sintered granule, the method including performing extrusion molding on a resin composition containing a thermoplastic resin, an aluminum nitride powder, and a sintering aid to mold the resin composition into a strand-shaped green body, thereafter cutting the strand-shaped green body to obtain green chips, and then calcining the obtained green chips (Patent Document 4).

Examples of such a known method also include a method of producing aluminum nitride, the method including nitriding a metallic aluminum powder having an average particle size of 10 to 250 μm by a combustion synthesis reaction in a nitrogen atmosphere at a pressure of 2 to 30 atmospheres (Patent Document 5).

CITATION LIST

Patent Documents

[Patent Document 1] Japanese Patent Application Publication No. H07-215707
[Patent Document 2] Japanese Patent Application Publication No. 2016-37438
[Patent Document 3] Japanese Patent Application Publication No. 2013-87042
[Patent Document 4] Japanese Patent Application Publication No. 2013-60322
[Patent Document 5] Japanese Patent Application Publication No. 2000-16805

SUMMARY OF INVENTION

Technical Problem

A method such as in Patent Document 1 or 5 however generates an aluminum nitride fine powder as a by-product in a cracking step for obtaining a powder, and such a fine powder is difficult to be removed by classification etc. because firmly adhering to other particles. An aluminum nitride powder contaminated by such a fine powder that is hard to completely remove is difficult to be mixed a lot in a resin, which makes it impossible to expect increase of the filling density for a resin.

The methods in Patent Documents 2 and 3 are methods of producing aluminum nitride by reduction-nitridation process on an alumina granule (granulated material). It is however not easy to completely converse an alumina granule to aluminum nitride, and practically, at least a little amount of alumina remains in the aluminum nitride particle. Particularly, when a large-sized aluminum nitride powder is produced, the foregoing problem may be more noticeable. If alumina remains, the aluminum nitride powder contains a comparatively large amount of oxygen. Moreover, the oxidation treatment is carried out in these methods, which may be also one reason for increasing oxygen contained in the aluminum nitride powder. The more aluminum nitride contains oxygen (that is, low thermal-conductive alumina remains), the lower the thermal conductivity may be, which leads to a deteriorating function as a filler.

Mixing of an additive such as a binder resin and a sintering aid into the alumina granule in the methods of Patent Documents 2 and 3 leads to components (such as carbon and rare-earth elements) in the additive remaining in the aluminum nitride powder, which may make it impossible to sufficiently obtain original characteristics of aluminum nitride.

A large-sized aluminum nitride granule may be comparatively easily made by a method as in Patent Document 4. A sintering aid such as yttria itself can be, however, a cause of low thermal conductivity. Impurities that may be contained in aluminum nitride used as a raw material is also a cause of preventing the thermal conductivity from being improved.

A primary object of the present invention is therefore to provide an aluminum nitride-based powder that includes less amount of fine powder that is hard to be completely removed, has superior filling performance for a polymeric material, and also has high thermal conductivity.

Solution to Problem

As a result of their intensive research with the problems of the conventional arts in view, the inventors of the present invention found out that an aluminum nitride-based powder obtained by a specific production method has peculiar constitution and characteristics, to have completed the present invention.

That is, the present invention relates to the following aluminum nitride-based powder and method of producing the same.

1. An aluminum nitride-based powder comprising aluminum nitride-based particles, wherein (1) an average particle size D50 is 15 to 200 µm;

(2) a content of particles having a particle diameter of 5 µm or less is not more than 60% on a particle number basis;

(3) a content of an alkaline earth metal element and a rare-earth element is not more than 0.1 weight %;

(4) a content of oxygen is not more than 0.5 weight %; and (5) a content of silicon is not more than 1000 ppm by weight, and a content of iron is not more than 1000 ppm by weight.

2. The aluminum nitride-based powder according to the section 1, wherein the aluminum nitride-based powder includes an agglomerating particle in which fine particles having a particle size of 5 µm or less adhere to particles having a particle size of more than 5 µm.

3. The aluminum nitride-based powder according to the section 1, wherein the aluminum nitride-based powder includes an agglomerating particle in which fine particles having a particle size of 1 µm or less adhere to particles having a particle size of more than 5 µm, an average number of the fine particles adhering to the particle having a particle size of more than 5 µm viewed from one side is not more than 50.

4. The aluminum nitride-based powder according to the section 1, wherein a content of carbon is not more than 0.1 weight %.

5. The aluminum nitride-based powder according to the section 1, wherein the aluminum nitride-based powder has a BET specific surface area of 0.08 to 0.5 $m^2/g$.

6. A method of producing an aluminum nitride-based powder, the method including: a step of heat-treating a raw material composed of an aluminum nitride powder in a non-oxidizing atmosphere at 1600° C. to 2000° C., wherein the raw material of the aluminum nitride powder contains:

a) 0.1 weight % or less of an alkaline earth metal element and a rare-earth element;

b) 0.5 weight % or less of oxygen; and c) not more than 1000 ppm by weight of silicon, and not more than 1000 ppm by weight of iron.

7. The method according to the section 6, wherein the raw material of the aluminum nitride powder is a crushed material.

8. The method according to the section 6, the method further including:

a step of preparing the raw material composed of the aluminum nitride powder prior to the step of heat-treating, wherein a reaction product that is obtained by a reaction of aluminum and a nitrogen gas is crushed to obtain the raw material composed of the aluminum nitride powder.

9. A composition including:

the aluminum nitride-based powder according to any one of the sections 1 to 5; and a polymeric material.

Advantageous Effects of Invention

The present invention may provide an aluminium nitride-based powder that includes less amount of fine powder that is hard to be completely removed, has superior filling ability for a polymeric material, and also has high thermal conductivity.

The aluminium nitride-based powder of the present invention can be compounded with a polymeric material at a high packing fraction since leading to decrease of a fine powder (particularly a fine particle having a particle diameter of 5 µm or less) that deteriorates the filling performance for a polymeric material, and as a result, may provide a material showing high thermal conductivity or heat dissipation. The aluminum nitride-based powder of the present invention may more surely have original characteristics of aluminum nitride than aluminum nitride-based powder containing an additive such as a sintering aid and an organic binder since controlled to have a desired particle size, not using such an additive.

The production method of the present invention makes it possible to take a fine powder into a large particle to substantially adhere the fine powder to the large particle, or integrate the fine powder into the large particle by a predetermined heat treatment even if a crushed product containing a comparatively large amount of the fine powder is used as a raw material, and as a result, makes it possible to efficiently reduce the fine powder, and to obtain a powder of a large-sized particle.

The aluminum nitride-based powder of the present invention which has the foregoing features may be preferably used as, for example, a high thermal-conductive filler (filler powder) used for a high thermal-conductive molded product, grease, adhesive, paint, etc. based on a polymeric material (such as a synthetic resin). More specifically, the aluminum nitride-based powder of the present invention, or a resin composition containing the aluminum nitride-based powder can be used as a housing, a chassis, a substrate, a sealing material, a heat exchanger plate, a heat sink material, and any high thermal-conductive material other than them for devices on which heat generating components are mounted (such as IPU, an integrated circuit, a power module, a display, a LED light, a converter, and a charger).

BRIEF DESCRIPTION OF DRAWINGS

FIG. 1

FIG. 1(a) and FIG. 1(b) show the results of observation of a particle of an aluminum nitride powder obtained in Example 1 by means of a scanning electron microscope; FIG. 1(a) shows the particle before heat treatment; and FIG. 1(b) shows the particle after heat treatment.

FIG. 2

FIG. 3

DESCRIPTION OF EMBODIMENTS

1. Aluminum Nitride-Based Powder

The aluminum nitride-based powder according to the present invention (powder of the present invention) is a powder comprising aluminum nitride-based particles, wherein (1) an average particle diameter D50 is 15 to 200 μm;

(2) a content of particles having a particle diameter of 5 μm or less is not more than 60% on a particle number basis;

(3) a content of an alkaline earth metal element and a rare-earth element is not more than 0.1 weight %;

(4) a content of oxygen is not more than 0.5 weight %; and (5) a content of silicon is not more than 1000 ppm by weight, and a content of iron is not more than 1000 ppm by weight.

The average particle diameter D50 of the powder of the present invention is 15 to 200 μm, and preferably 50 to 150 μm. The average particle diameter D50 of less than 15 μm may lead to deteriorated filling performance for a polymeric material such as a resin or the like. The average particle diameter D50 of more than 200 μm may lead to separation from a polymeric material such as a resin etc. when the powder of the present invention is mixed with the polymeric material.

In the powder of the present invention, a content of particles having a particle size of 5 μm or less is not more than 60%, and preferably not more than 55%, on the basis of the total number of particles. The proportion of the number of more than 60% leads to deteriorated filling performance for a polymeric material, which makes it impossible to obtain a highly thermal-conductive or highly heat-dissipating composition. The lower limit of the content is most preferably 0%, and may be normally approximately 0.1%.

A fine particle having a particle diameter of 5 μm or less (particularly 1 μm or less) is an obstacle to filling a polymeric material as described above, and a large amount of such a fine particle makes it difficult to prepare a desired resin composition etc. Therefore, it is desirable to remove a fine particle. A fine particle however does not solely exit but tends to adhere to a comparatively large particle. Thus, it is difficult to completely separate a fine particle only by classification etc., and takes so much effort and costs so much even if a fine particle is completely isolated. In contrast, the content of such a fine particle is largely reduced in the powder of the present invention, which may be achieved by, for example, adhering a fine particle to or integrating a fine particle into another particle (particularly a particle having a particle diameter of more than 5 μm) without a separation process, like the powder of the present invention obtained by the production method of the present invention. Thus, one feature of the powder of the present invention is to include at least an agglomerating particle in which fine particles having a particle diameter of 5 μm or less adhere to particles having a particle diameter of more than 5 μm. This agglomerating particle can behave as substantially one particle at least in a polymeric material as well, and does not negatively affect filling performance for a polymeric material etc. Here, adhesion refers to a status in which a fine particle is attached and fixed to another particle such that the shape of the fine particle can still be observed.

As the number of fine particles having a particle diameter of 5 μm or less (preferably 1 μm or less) per one particle having a particle size of more than 5 μm (substrate particle) is increasing, the number of the fine particles dropping off (separating) from the substrate particle during mixing with a resin etc. may increase. Thus, a smaller number of the fine particles adhering to the substrate particle is more preferable. Particularly, when the powder includes an agglomerating particle in which the fine particles having a particle diameter of at most 1 μm adhere to the substrate particle, and the number of fine particles having a particle diameter of at most 1 μm which adhere to the substrate particle is observed by means of an electron microscope or the like, the average number of the fine particles adhering to the substrate particle (the number of the fine particles present in one substrate particle) is desirably 50 or less, and especially desirably 10 or less, in a visual field when the whole of one substrate particle is viewed from one direction. The smaller the lower limit thereof is, the more preferable. For example, the lower limit thereof is 1. More specifically, 30 substrate particles having a particle diameter of ±15% of the average particle diameter D50 (having a particle diameter of more than 5 μm) are randomly selected, the number of fine particles having a particle diameter of at most 1 μm present on the surface of each substrate particle (in a visual field when the whole of the one substrate particle is observed in one direction) is totalized, and the average number of the fine particles present in these 30 substrate particles (the number of the fine particles present per one substrate particle) is preferably at most 50, and especially more preferably 1 to 10.

The content of an alkaline earth metal element and a rare-earth element in the powder of the present invention is 0.1 weight % or less, and preferably 0 to 0.05 weight %. When the content is more than 0.1 weight %, it is impossible to sufficiently obtain inherent characteristics of aluminum nitride (particularly thermal conductivity). Note that the foregoing content is the total content of an alkaline earth metal element and a rare-earth element.

Examples of alkaline earth metal elements include at least one of calcium, strontium, barium, and radium. Examples of rare-earth elements include at least one of yttrium, lanthanum, cerium, praseodymium, neodymium, promethium, samarium, europium, gadolinium, terbium, dysprosium, holmium, erbium, thulium, ytterbium, and lutetium. Thus, another feature of the powder of the present invention is not containing a sintering aid such as yttria or a component derived therefrom (particularly the foregoing elements).

The powder of the present invention normally contains 0.5 weight % or less, and preferably 0.2 weight % or less of oxygen. When the oxygen content is more than 0.5 weight %, thermal conductivity may decrease. The lower limit of the oxygen content is not restricted, but may be normally approximately 0.01 weight %.

The powder of the present invention normally contains 0.1 weight % or less, and preferably 0.06 weight % or less of carbon. When the carbon content is more than 0.1 weight %, thermal conductivity may be reduced. The lower limit of the carbon content is not restricted, but may be normally about 0.005 weight %.

The powder of the present invention contains 1000 ppm by weight or less of silicon and 1000 ppm by weight or less of iron. The lower limits of the silicon content and the iron content are not restricted, but may be normally approximately 100 ppm by weight respectively in order to avoid the increase of costs for refining. Accordingly, an aluminum nitride powder obtained by the so-called direct-nitriding method may be preferably used as a raw material of the powder of the present invention. More specifically, an aluminum nitride powder obtained by crushing a resultant material prepared by a reaction of aluminum and a nitrogen gas can be used as the raw material.

The powder of the present invention preferably has a BET specific surface area of 0.05 to 0.50 $m^2/g$, and especially more preferably 0.08 to 0.49 $m^2/g$, which may be therefore set in, for example, 0.05 to 0.1 $m^2/g$. Setting the BET specific surface area within this range makes it possible to effectively prevent the increase of viscosity in kneading in a resin etc., which results in a high filling density.

In the present invention, viscosity of a mixture obtained by adding the powder of the present invention to a polymeric material may be used as an index showing filling performance for the polymeric material.

First, in the mixture of the polymeric material and the powder of the present invention, the amount of the powder of the present invention necessary for reaching a certain viscosity is comparatively large. More specifically, as shown in Test Example 1 (5-1) described later, the content (filling rate) of the powder of the present invention at the time point when the viscosity of the mixture is within a range of 45 to 50 Pa·s (25° C.) is used as an index, when the amount of the powder of the present invention added to a silicon oil is increased. In the present invention, the filling rate is preferably at least 50 volume %, especially more preferably at least 55 volume %, and further most preferably at least 60 volume %. In a conventional aluminum nitride powder including a fine particle, a comparatively large amount of the fine particles exist, which thickens with a comparatively small amount of addition, to reach the foregoing certain viscosity. In contrast, in the powder of the present invention, at least 50 volume % of the fine particles can be added until the viscosity reaches the foregoing certain level. That is, this value shows that high filling performance for the polymeric material may be given.

Second, the filling rate of the powder of the present invention in the mixture is fixed, and the viscosity of a composition obtained thereby is used as an index. As shown in Test Example 1 (5-2) described later, in the present invention, the filling rates of the powder of the present invention in a mixture with a silicone oil are set in 50 volume % and 60 volume %, to identify respective viscosity. In the powder of the present invention, the viscosity at a filling rate of 50 volume % is preferably not more than 25 Pa·s, and especially more preferably 8 to 22 Pa·S. Likewise, in the powder of the present invention, the viscosity at a filling rate of 60 volume % is preferably not more than 45 Pa·s, and especially more preferably 25 to 36 Pa·S. As the foregoing description, the powder of the present invention may keep a comparatively low viscosity (that is, comparatively high fluidity) even at a certain filling rate.

2. Method of Producing Aluminum Nitride-Based Powder

The powder of the present invention may be preferably produced by, for example, a method of producing an aluminum nitride-based powder, the method comprising:

a step of heat-treating an aluminum nitride powdery raw material in a non-oxidizing atmosphere at 1600° C. to 2000° C., wherein the aluminum nitride powdery raw material contains:

a) 0.1 weight % or less of an alkaline earth metal element and a rare-earth element;

b) 0.5 weight % or less of oxygen; and c) 1000 ppm by weight or less of silicon, and 1000 ppm by weight or less of iron.

Starting Material

In the present invention, the aluminum nitride powdery raw material containing: a) 0.1 weight % or less of an alkaline earth metal element and a rare-earth element; b) 0.5 weight % or less of oxygen; and c) 0 to 1000 ppm by weight of silicon, and 0 to 1000 ppm by weight of iron is used as a starting material.

Any known or commercially available material can be used for such an aluminum nitride powdery raw material itself. An aluminum nitride powder produced by a known production method may be also used therefor. For example, any aluminum nitride powder obtained by reducing an alumina powder (aluminum nitride powder by the reduction method), an aluminum nitride powder obtained by nitriding an aluminum powder (an aluminum nitride powder by the direct nitridation), and the like may be used. Among them, an aluminum nitride powder by the direct nitridation may be preferably used in view of easy production of an aluminum nitride powder at comparatively low costs. In the present invention, the direct nitridation encompasses the combustion synthesis method, in addition to a method of heating a metallic aluminum powder in a nitrogen gas at 1000° C. or higher (direct nitridation in a narrow sense). That is, an aluminum nitride powder obtained by a method comprising a step of nitriding a metallic aluminum powder by the combustion synthesis method can be also preferably used as the raw material of an aluminum nitride powder.

In the present invention, a crushed product can be preferably used as the aluminum nitride powdery raw material. Namely, a crushed product obtained by mechanically crushing a rough powder or aggregating material of a synthetic aluminum nitride. In the production method of the present invention, adhering the fine particle to or integrating the fine particle into a larger-sized particle by specific heat treatment makes it possible to effectively prevent deterioration of filling performance due to the fine particle even when the raw material contains the fine particle (normally having a particle size of at most 5 μm, particularly at most 1 μm) and composed of a powder from which part or the whole of the fine particle cannot be removed, like a crushed material.

Therefore, in the present invention, an aluminum nitride powder obtained by the direct nitridation, which is a crushed material, can preferably be used as a starting material. That is, the present invention encompasses a method comprising the step of preparing a starting material by the direct nitridation process, prior to the heat treatment step. More specifically, the present invention encompasses a method of further including the step of preparing the aluminum nitride powdery raw material prior to the heat treatment step, wherein a reaction product obtained by a reaction of aluminum and a nitrogen gas is crushed to obtain the aluminum nitride powdery raw material.

Figure 1:
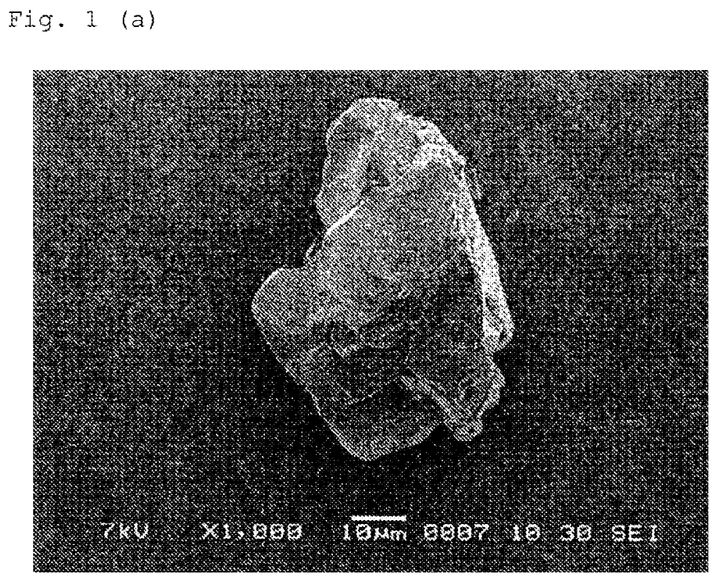

The average particle diameter D50 of the aluminum nitride powdery raw material is not specifically limited, but is normally approximately 1 to 200 µm, and especially preferably 15 to 100 µm. The shape of a particle constituting the aluminum nitride powdery raw material is not limited as well, and for example, can be any of spherical, flake, indefinite, etc. A powder composed of a particle having an angular indefinite shape can be preferably used as a starting material since a crushed material can be used. For example, the production method of the present invention changes a particle having an angular shape unique to a crushed material (FIG. 1 (a)) into a comparatively smooth shape with its angular parts removed therefrom (FIG. 1 (b)). That is, the powder of the present invention is constituted of an aluminum nitride-based particle whose angular parts are round, which is one feature thereof. This can be obtained by the heat treatment step described later.

Heat Treatment Step

In the heat treatment step, the aluminum nitride powdery raw material as described above is subjected to heat treatment in a non-oxidizing atmosphere at 1600° C. to 2000° C.

The heat treatment temperature may be normally approximately 1600° C. to 2000° C., and especially preferably 1650° C. to 1950° C. Heat treatment at such a temperature makes it possible to effectively adhere the fine powder (especially fine particle having a particle size of 5 µm or less) to a larger-sized particle or integrate the fine powder into a larger-sized particle; and at the same time, may form a particle having an angular indefinite shape into a round particle with its angular parts removed therefrom. The heat treatment atmosphere can be a non-oxidizing atmosphere, which may be, for example, any of a reducing atmosphere, an inert gas atmosphere, a vacuum pressure atmosphere, etc. The heat treatment time can be suitably set normally within a range of 0.5 to 48 hours, but is not limited thereto.

After the heat treatment step, a process of classification etc. can be performed as necessary. Specifically, it is desirable not to perform a crushing step in the present invention. Crushing for adjusting the particle size is desirably performed before the heat treatment step because a fine powder is generated in the crushing step.

3. Composition Containing Powder of Present Invention

The present invention encompasses a composition containing the powder of the present invention and a polymeric material (composition of the present invention). In other words, a highly thermal-conductive composition containing a polymeric material and the powder of the present invention as a highly thermal-conductive filler is also encompassed in the present invention.

Examples of a polymeric material include resins, rubbers, and elastomers. More specific examples of resin components include silicone resins, phenol resins, urea resins, melamine resins, xylene resins, diallyl phthalate resins, epoxy resins, thermosetting polybutadiene, furan resins, urethane resins, alkylbenzene resins, guanamine resins, unsaturated polyester resins, and saturated alkyd resins (glyptal resins, unsaturated alcohol modified phthalic resins, isophthalic acid resins, terephthalic acid resins, aliphatic polyester resins and polycarbonate resins). Examples of rubbers include fluororubbers, silicone rubbers, and urethane rubbers. Examples of elastomers include styrene elastomers, polyolefin elastomers, polyvinyl chloride elastomers, polyurethane elastomers, and polyamide elastomers. These polymeric materials may be either liquid or solid at ordinary temperatures. Any known or commercially available material can be employed for these polymeric materials.

Among them, the powder of the present invention may be preferably used as a filling material (filler) for silicone polymeric materials such as a silicone resin. The powder of the present invention can be added into a silicone polymeric material at a higher filling density.

Any additive other than the powder of the present invention may be incorporated into the composition of the present invention as long as they do not substantially adversely affect the advantages of the present invention. Examples thereof include fillers other than the powder of the present invention, coloring agents, anti-oxidants, UV absorbers, plasticizers, or the like.

Containing the powder of the present invention in these various materials makes it possible to prepare a resin composition superior in thermal conductivity etc. The content of the powder of the present invention in the composition of the present invention in this case is not specifically limited, but a composition having a high filling rate of normally at least 50 volume %, especially 60 to 90 volume %, and further 80 to 95 volume % can be produced. Such a composition (composite material) containing the powder of the present invention thereinto at a high filling density can exhibit excellent thermal conductivity or heat dissipation.

Any method may be employed for mixing the powder of the present invention with the polymeric material as long as they are uniformly mixed. For example, they may be mixed using a known mixing machine such as a mixer, a kneader, or the like.

The composition of the present invention obtained in such a manner can be also provided in the form of a molded product with further molding. A molding method is not specifically limited, and for example, any known molding method such as press molding, extrusion molding, and injection molding can be employed.

High thermal conductivity can be also obtained from the molding product of the present invention since a specific aluminum nitride-based powder (filler) disperses comparatively uniformly. Thus, for example, the molding product of the present invention can be widely used for various products (such as electronic devices, automotive components, and medical equipment) as a heat-dissipating material or a highly thermal-conductive material. Particularly, the molding product of the present invention can be preferably used as components of a device on which heat generating components are mounted. In this case, a desired performance may be obtained by using the molding product of the present invention under the same conditions for known heat release materials or high thermal-conductive materials.

EXAMPLES

Examples and Comparative Examples will be given hereinafter, to more specifically describe the features of the present invention. The scope of the present invention is not limited to Examples.

Example 1

Aluminum nitride was obtained by the method described in "No. 8" of "Example 2" of Japanese Patent Application Publication No. 2000-16805 (Patent Document 5), and thereafter an aluminum nitride powder having a particle size of approximately 0.5 mm was prepared by a jaw crusher and a roll crusher. The obtained powder was pulverized by means of an alumina mortar while the particle diameter thereof was checked, to obtain a powder having an average particle diameter D50 of 60 μm. This was used as an aluminum nitride powdery raw material. 500 g of this the aluminum nitride powdery raw material was put into a carbon container, and subjected to heat treatment in a Horizontal Vacuum Dewaxing Sintering furnace (manufactured by Shimadzu Mectem, Inc.) in a nitrogen atmosphere at 1850° C. for 24 hours. After cooled, the aluminum nitride-based powder was taken out of the sintering furnace. The aluminum nitride powdery raw material contained a) 0.0 weight % of an alkaline earth metal element and a rare-earth element, b) 0.1 weight % of oxygen, and c) 348 ppm by weight of silicon and 690 ppm by weight of iron.

Example 2

An aluminum nitride-based powder was obtained in the same manner as in Example 1 except that an aluminum nitride powdery raw material which was prepared to have the average particle diameter D50 of 200 μm was used. The aluminum nitride powdery raw material contained a) 0.0 weight % of an alkaline earth metal element and a rare-earth element, b) 0.1 weight % of oxygen, and c) 348 ppm by weight of silicon and 690 ppm by weight of iron.

Example 3

An aluminum nitride-based powder was obtained in the same manner as in Example 1 except that an aluminum nitride powdery raw material which was prepared to have the average particle diameter D50 of 30 μm was used. The aluminum nitride powdery raw material contained a) 0.0 weight % of an alkaline earth metal element and a rare-earth element, b) 0.1 weight % of oxygen, and c) 348 ppm by weight of silicon and 690 ppm by weight of iron.

Example 4

An aluminum nitride-based powder was obtained in the same manner as in Example 1 except that the heat treatment temperature was 2000° C., and the heat treatment time was 1 hour.

Example 5

An aluminum nitride-based powder was obtained in the same manner as in Example 1 except that the heat treatment temperature was 1600° C.

Example 6

An aluminum nitride-based powder was obtained in the same manner as in Example 1 except that an aluminum nitride powdery raw material which was prepared to have the average particle diameter D50 of 25 μm was used, the heat treatment temperature was 1710° C., and the heat treatment time was 1 hour. The aluminum nitride powdery raw material contained a) 0.0 weight % of an alkaline earth metal element and a rare-earth element, b) 0.1 weight % of oxygen, and c) 348 ppm by weight of silicon and 690 ppm by weight of iron.

Example 7

An aluminum nitride-based powder was obtained in the same manner as in Example 1 except that an aluminum nitride powdery raw material which was prepared to have the average particle diameter D50 of 15 μm was used, the heat treatment temperature was 1710° C., and the heat treatment time was 1 hour. The aluminum nitride powdery raw material contained a) 0.0 weight % of an alkaline earth metal element and a rare-earth element, b) 0.1 weight % of oxygen, and c) 348 ppm by weight of silicon and 690 ppm by weight of iron.

Comparative Example 1

An aluminum nitride-based powder was obtained in the same manner as in Example 1 except that an aluminum nitride powdery raw material which was prepared to have the average particle diameter D50 of 250 μm was used. The aluminum nitride powdery raw material contained a) 0.0 weight % of an alkaline earth metal element and a rare-earth element, b) 0.1 weight % of oxygen, and c) 348 ppm by weight of silicon and 690 ppm by weight of iron.

Comparative Example 2

An aluminum nitride-based powder was obtained in the same manner as in Example 1 except that an aluminum nitride powdery raw material which was prepared to have the average particle diameter D50 of 5 μm was used, the heat treatment temperature was 1710° C., and the heat treatment time was 1 hour.

Comparative Example 3

An aluminum nitride-based powder was obtained in the same manner as in Example 1 except that the heat treatment temperature was 1500° C.

Comparative Example 4

The raw material of an aluminum nitride powder which was prepared to have the average particle diameter D50 of 60 μm in Example 1 was evaluated as it is without heat treatment of an aluminum nitride powdery raw material.

Comparative Example 5

An aluminum nitride-based powder was obtained in the same manner as in Example 1 except that an aluminum nitride powdery raw material which was prepared to have the average particle diameter D50 of 5 μm was used. The aluminum nitride powdery raw material contained a) 0.0 weight % of an alkaline earth metal element and a rare-earth element, b) 0.1 weight % of oxygen, and c) 348 ppm by weight of silicon and 690 ppm by weight of iron.

Comparative Example 6

A commercial product of an aluminum nitride powder ("FAN-f80" manufactured by Furukawa Denshi Co., Ltd., average particle diameter D50: 80 μm) was used as an aluminum nitride powdery raw material. The aluminum nitride contained a) 2.3 weight % of an alkaline earth metal element and a rare-earth element, b) 1.58 weight % of oxygen, and c) 19 ppm by weight of silicon and 19 ppm by weight of iron.

Test Example 1

The following physical properties of the powder obtained in each of Examples and Comparative Examples were evaluated. The results are shown in Table 1.

(1) Particle Diameter D50

A sample was measured by means of a particle size distribution measuring device based on the laser diffraction and scattering principle, "Microtrac MT3300EXII" manufactured by MicrotracBEL Corp. A 6% solution of sodium hexametaphosphate was used as a dispersant.

(2) Composition and Components (2-1) Content of Alkaline Earth Metal Element and Rare-Earth Element A sample was heated together with a 11% solution of sodium hydroxide in a pressurized vessel at 130° C. for 2 hours, to dissolve. The dissolving solution was collected in a quartz beaker, and 20% hydrochloric acid was added thereto, to be heated on a hot plate at 200° C. for 20 minutes, to prepare a sample solution. The obtained sample solution was analyzed by means of an ICP optical emission spectrometry, "iCAP6500DuoView" manufactured by Thermo Fisher Scientific Inc.

(2-2) Oxygen Content

A sample was analyzed using an oxygen/nitrogen analyzer, "EMGA-920" manufactured by Horiba, Ltd.

(2-3) Iron Content

A sample was heated together with a 11% solution of sodium hydroxide in a pressurized vessel at 130° C. for 2 hours, to dissolve. The dissolving solution was collected in a quartz beaker, and 20% hydrochloric acid was added thereto, to be heated on a hot plate at 200° C. for 20 minutes, to prepare a sample solution. The obtained sample solution was analyzed by means of an ICP optical emission spectrometry, "iCAP6500DuoView" manufactured by Thermo Fisher Scientific Inc.

(2-4) Silicon Content

A sample was heated together with a 11% solution of sodium hydroxide in a pressurized vessel at 130° C. for 2 hours, to dissolve. The dissolving solution was collected in a quartz beaker, and 20% hydrochloric acid was added thereto, to be heated on a hot plate at 200° C. for 20 minutes, to prepare a sample solution. The obtained sample solution was analyzed by means of an ICP optical emission spectrometry, "iCAP6500DuoView" manufactured by Thermo Fisher Scientific Inc.

(2-5) Carbon Content

A sample was analyzed using an oxygen/nitrogen analyzer "EMIA-920V" manufactured by Horiba, Ltd.

(3) Constitution and Structure of Particle (3-1) Rate of Number of Particle Having Particle Size of at Most 5 μm The particle diameter was measured by observation by means of a scanning electron microscope. The number of the particles observed using "JSM-6510A" manufactured by JEOL Ltd. was 100, which made it possible to statistically reflect characteristics of each powder at a magnification of 1000 times.

(3-2) Number of Adhering Particles

The number of particles having a particle size of at most 1 μm which adhered to one substrate particle was counted by observation by means of a scanning electron microscope. The particles magnified 100 times using "JSM-6510A" manufactured by JEOL Ltd. was observed, and then the particles in the visual field at a magnification of 1000 times were magnified 5000 times, to be observed. The objected particles were measured so that the longest diameter thereof was defined as a particle size, 30 particles having a particle size of ±15% of the average particle diameter D50 (having a particle diameter of more than 5 μm) was randomly selected therefrom, the number of fine particles having a particle size of at most 1 μm present in the surface of the substrate particle (in a viewing field when one of the whole of the substrate particle was observed in one direction) was counted, and the average number of fine particles adhering to 30 substrate particles (the number of fine particle adhering per one substrate particle) was calculated.

Figure 2:
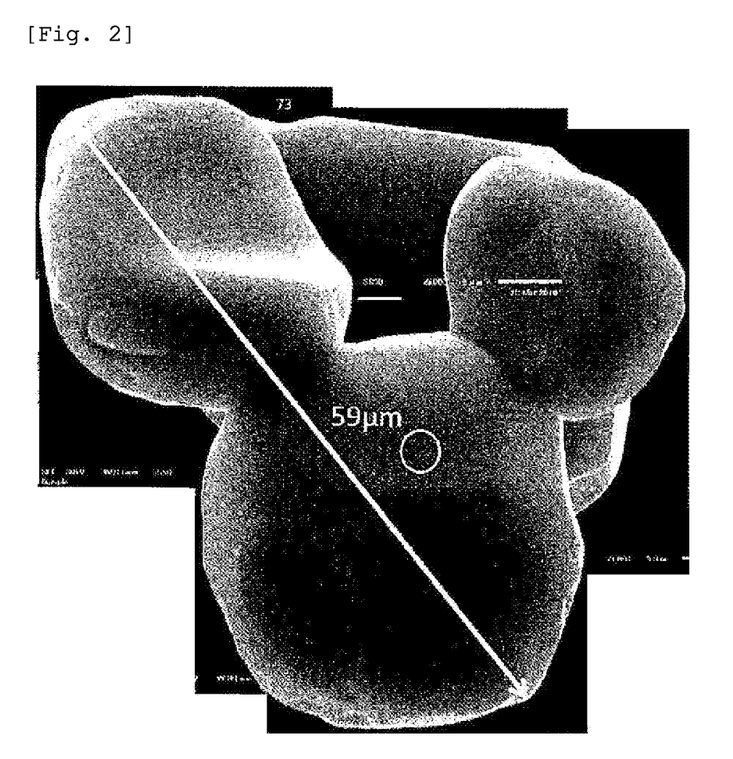
FIG. 2 shows a manner where the number of fine particles adhering to the surface of a substrate particle in an aluminum nitride powder obtained in Example 1 was counted.

For example, FIG. 2 shows a manner where the number of adhering particles of the samples in Example 1 was counted. Since D50 was 60 μm in Example 1, a particle size±15% of D50 was within the range of 51 to 69 μm. A particle having a longest diameter of 59 μm was selected as one particle having a particle size of that range, fine particles observed in the viewing field were marked with circles, to count the number thereof. As a result, one fine particle was observed in the viewing field, which means that the number of fine particles adhering to this substrate particle was 1. Likewise, the number of fine particles adhering to respective 30 substrate particles in total was measured. The total number of the fine particles was divided by 30, to obtain the average thereof.

Figure 3:
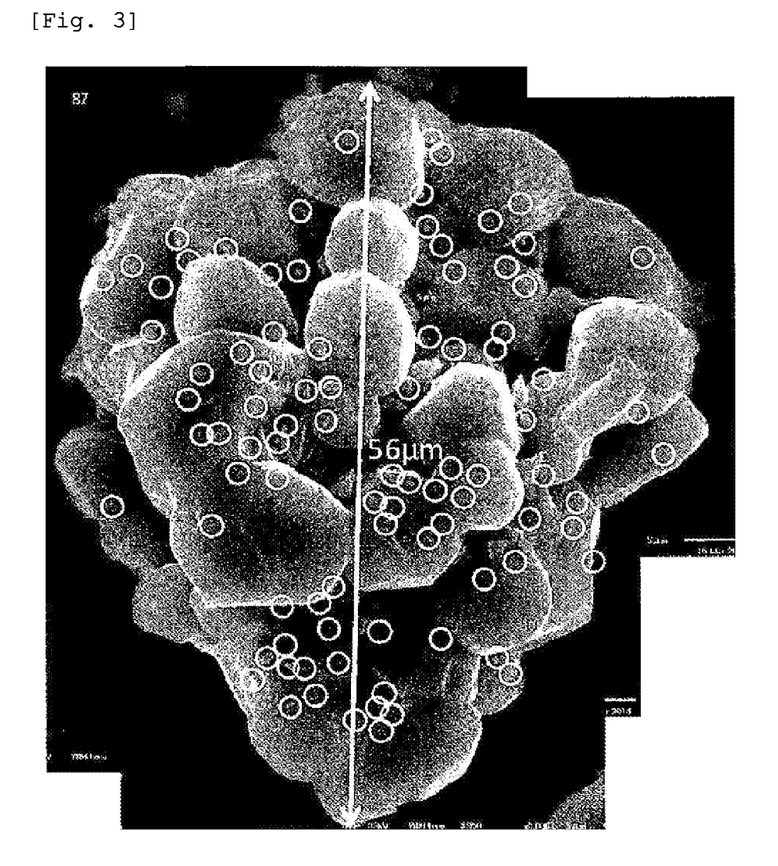
FIG. 3 shows a manner where the number of fine particles adhering to the surface of a substrate particle in the aluminum nitride powder obtained in Comparative Example 4 was counted.

For comparison, FIG. 3 shows a manner where the number of adhering particles of the samples in Comparative Example 4 was counted. Since D50 was 60 μm in Comparative Example 4, a particle size±15% of D50 was within the range of 51 to 69 μm. A particle having a longest diameter of 56 μm was selected as a particle having a particle diameter of that range, fine particles observed in the viewing field were marked with circles, to count the number thereof. As a result, 109 fine particles were observed in the viewing field. In view of this, in the same manner as in Example 1, the number of fine particles adhering to respective 30 substrate particles in total was measured, to obtain the average thereof.

(4) BET Specific Surface Area

A sample was measured using "Mac Sorb HM model-1210" manufactured by Mountech Co., Ltd.

(5) Filling Characteristics for Polymeric Material (5-1) Filling Rate

The loading amount of each powder was checked as increased when the powder was mixed with a commercially available silicone oil, "Shin-Etsu Silicone KF-96-500cs" (manufactured by Shin-Etsu Chemical Co., Ltd.) until the obtained mixture had a certain viscosity. More specifically, 45 to 50 Pa·s (25° C.) was set as a reference viscosity under conditions of 50 rpm (25° C.) by a digital viscometer, "DV-II+Pro" (manufactured by Brookfield). A larger loading amount means more excellent filling performance. In this case, in Table 1, in the case where the mixture was solidified was represented by "solidified", and in the case where the powder and the oil were separated was represented by "separated".

(5-2) Viscosity of Mixture a) 32.6 g of each powder was weighed, to be mixed with 9.7 g of a silicone oil same as in the above (5-1). The obtained mixture was mixed by means of a stirrer for 3 minutes, to prepare a sample for viscosity evaluation, to obtain 50 vol % of an evaluation sample.

b) 47.2 g of each powder was weighed, to be mixed with 9.4 g of a silicone oil same as in the above (5-1). The obtained mixture was mixed by means of a stirrer for 3 minutes, to prepare a sample for viscosity evaluation, to obtain 60 vol % of an evaluation sample.

c) 0.7 ml of each sample for viscosity evaluation a) and b) was measured to be taken by a syringe, and the viscosity thereof was measured by means of a digital viscometer same as in the above (5-1). The viscosity was measured at 25° C. in the sample temperature at 50 rpm in rotation speed. A lower viscosity means more excellent filling performance for a resin. In this case, in Table 1, in the case where the mixture was solidified was represented by "solidified", and in the case where the powder and the oil were separated was represented by "separated".

TABLE 1

| | average particle diameter D50 (μm) | number of particles having particle size of at most 5 μm (%) | number of adhering particles (particles) | oxygen content (wt %) | carbon content (wt %) | silicon content (ppm) | iron content (ppm) | alkaline earth and rare-earth content (wt %) | 50% viscosity (Pa·s) | 60% viscosity (Pa·s) | filling rate (vol %) | specific surface area (m²/g) |
|---|---|---|---|---|---|---|---|---|---|---|---|---|
| Example 1 | 60 | 35 | 6 | 0.02 | 0.025 | 300 | 258 | 0 | 22 | 36 | 64 | 0.09 |
| Example 2 | 200 | 5 | 8 | 0.05 | 0.021 | 322 | 263 | 0 | 20 | 34 | 65 | 0.08 |
| Example 3 | 30 | 2 | 8 | 0.04 | 0.021 | 306 | 261 | 0 | 23 | 40 | 62 | 0.48 |
| Example 4 | 60 | 13 | 2 | 0.06 | 0.055 | 297 | 265 | 0 | 21 | 35 | 64 | 0.08 |
| Example 5 | 60 | 55 | 48 | 0.11 | 0.010 | 325 | 630 | 0 | 24 | 40 | 61 | 0.16 |
| Example 6 | 25 | 10 | 3 | 0.09 | 0.017 | 285 | 558 | 0 | 19 | 41 | 58 | 0.34 |
| Example 7 | 15 | 31 | 2 | 0.09 | 0.029 | 313 | 580 | 0 | 10 | 42 | 61 | 0.39 |
| Comparative Example 1 | 250 | 4 | 261 | 0.04 | 0.009 | 320 | 259 | 0 | separated | separated | separated | 0.07 |
| Comparative Example 2 | 5 | 43 | 3 | 0.28 | 0.017 | 154 | 167 | 0 | 43 | solidified | 48 | 0.73 |
| Comparative Example 3 | 60 | 66 | 182 | 0.11 | 0.028 | 348 | 690 | 0 | 24 | solidified | 58 | 0.17 |
| Comparative Example 4 | 60 | 66 | 184 | 0.11 | 0.009 | 352 | 713 | 0 | 24 | solidified | 58 | 0.18 |
| Comparative Example 5 | 5 | 36 | 2 | 0.36 | 0.031 | 176 | 352 | 0 | solidified | solidified | 48 | 1.14 |
| Comparative Example 6 | 80 | — | 0 | 1.58 | 0.008 | 19 | 19 | 2.3 | 17 | 35 | 64 | 0.14 |

As is clearly seen from the results in Table 1, it is found that the aluminum nitride-based powders in Comparative Examples 1 to 5 contained a large number of the fine powder, so that good filling characteristics cannot be obtained. Particularly, the number of particles having a particle diameter of 1 μm or less which adhered to the particle was large in Comparative Example 4. A particle having a particle diameter of 1 μm or less causes the viscosity to increase by separation from the resin when kneaded with a resin as a filler. A commercially available material in Comparative Example 6 had good filling characteristics, but contained a large amount of alkaline earth metal elements and rare-earth elements. In contrast, it is found that: the aluminum nitride-based powder in each Example contained a small amount of alkaline earth metal elements, rare-earth elements, etc., and also contained a comparatively small amount of the fine particle; further, in each Example, a particle having a particle diameter of 1 μm or less which adhered to the substrate particle was taken (integrated) into the particle by substance diffusion in heat treatment, which may reduce the number of the adhering fine particles, and as a result, filling characteristics for the polymeric material (filling rate) may be improved.

The invention claimed is:

1. An aluminum nitride-based powder comprising aluminum nitride-based particles, wherein
    (1) an average particle diameter D50 is 15 to 200 μm;
    (2) a content of particles having a particle diameter of 5 μm or less is not more than 60% on a particle number basis;
    (3) a content of an alkaline earth metal element and a rare-earth element is not more than 0.1 weight %;
    (4) a content of oxygen is not more than 0.2 weight %;
    (5) a content of silicon is not more than 1000 ppm by weight, and a content of iron is not more than 1000 ppm by weight, and
    (6) a BET specific surface area of the aluminum nitride-based powder is 0.05 to 0.1 m²/g.

2. The aluminum nitride-based powder according to claim 1, wherein the aluminum nitride-based powder contains an agglomerating particle in which fine particles having a particle diameter of 5 μm or less adhere to particles having a particle diameter of more than 5 μm.

3. The aluminum nitride-based powder according to claim 1, wherein the aluminum nitride-based powder contains an agglomerating particle in which fine particles having a particle diameter of 1 μm or less adhere to particles having a particle diameter of more than 5 μm, an average number of the fine particle adhering to one side of the particle having a particle size of more than 5 μm is 50 or less.

4. The aluminum nitride-based powder according to claim 1, wherein a content of carbon is not more than 0.1 weight %.

5. The aluminum nitride-based powder according to claim 1, wherein the aluminum nitride-based powder has a BET specific surface area of 0.08 to 0.5 m²/g.

6. The aluminum nitride-based powder according to claim 1, wherein a content of particles having a particle size of 5 pm or less is not more than 35% on a particle number basis.

7. A composition comprising:
    the aluminum nitride-based powder according to claim 1; and
    a polymeric material.

8. A composition comprising:
    the aluminum nitride-based powder according to claim 2; and
    a polymeric material.

9. A composition comprising:
    the aluminum nitride-based powder according to claim 3; and
    a polymeric material.

10. A composition comprising:
    the aluminum nitride-based powder according to claim 4; and
    a polymeric material.

11. A composition comprising:
    the aluminum nitride-based powder according to claim 5; and
    a polymeric material.

* * * * *